United States Patent Office 3,274,263
Patented Sept. 20, 1966

3,274,263
PROCESS FOR OLEFIN HYDROFORMYLATION
Charles R. Greene and Robert E. Meeker, Berkeley, Calif., assignors to Shell Oil Company, New York, N.Y., a corporation of Delaware
No Drawing. Filed Aug. 30, 1961, Ser. No. 134,852
5 Claims. (Cl. 260—632)

This invention relates to an improved process for hydroformylating olefins. More particularly, it relates to the catalytic hydroformylation of olefins with hydrogen and carbon monoxide using complex reduced-valence cobalt/trivalent phosphorus compound catalyst.

Hydroformylation is well known in the art and comprises converting an olefin to a corresponding aldehyde or alcohol, the aldehyde or alcohol group being substituted on one of the carbon atoms previously involved in the olefinic linkage. Isomerization of the original double bond may lead to different olefins, in which case the hydroformylation product is varied accordingly. The olefinic linkage is simultaneously saturated with the addition of hydrogen and the aldehyde or alcohol group to the molecule. Thus, hydroformylation may be shown in the general case by the following equation:

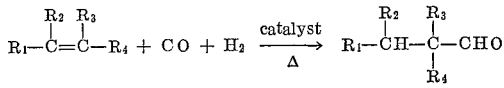

and/or

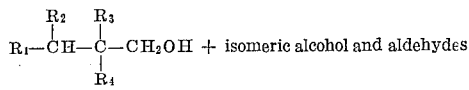

In the above equation, each R represents an organic radical or a suitable atom such as hydrogen or a halogen. The above reaction is applicable to aliphatic olefinic linkages, both acyclic and alicyclic.

The art teaches the use of dicobalt octacarbonyl per se or in various modified forms as catalyst for the hydroformylation of olefins. This catalyst, which can be prepared from many forms of cobalt, usually decomposes rapidly unless high pressures, say in the order of from 1000 to 4500 p.s.i.g., of carbon monoxide are maintained. Correspondingly high pressures of hydrogen are also necessary for the desired reaction. Improved hydroformylation catalysts which comprise certain transition metal complexes with biphyllic ligands have recently been discovered (copending application Serial No. 46,071, filed July 29, 1960, and now abandoned). Examples thereof are complexes of cobalt with carbon monoxide and tributyl phosphine or triphenyl phosphine. Other complexes will be discussed in detail hereinafter. Although such catalytic materials have desirable advantages over the former dicobalt octacarbonyl with regard in particular to their considerably increased stability so that the hydroformylation reaction will proceed at much lower pressures, they nevertheless have the unfortunate disadvantage under plant operating conditions of allowing for the decomposition of the metal complex and deposition of metal throughout various areas of the reaction zone and recovery train associated therewith. While the introduction at one or more points in the system of additional carbon monoxide pressure has been proposed, the results obtained from such stop-gap procedure are not completely satisfactory; thus the problem of metal deposition has heretofore been unresolved.

It is therefore a principal object of the present invention to provide new and improved means for the prevention of the breakdown of the hydroformylation metal complex catalyst with the attendant undesirable deposition of metal. Another object and feature of advantage is the provision of means for improving and maintaining the stability of a metal complex catalyst having carbon monoxide and organic phosphine ligands associated therewith. A still further and important object of the invention is the provision of a metal complex hydroformylation catalyst which is even more active than those heretofore taught in the art.

Other objects and features of advantage will be appreciated from a consideration of the following description and claims.

The invention in its broadest aspect contemplates the inclusion in the reaction zone of a suitable carboxylic acid or derivative thereof which is able to provide and maintain in the reaction medium a soluble compound of the metal forming the complex catalyst.

In general, an intermediate to higher molecular weight carboxylic acid, especially a hydrocarbon carboxylic acid, is preferred, although other carboxylates, which are inert to the reactants and the reaction medium are useful, including substituted and polycarboxylates, e.g., salicylic acid and azelaic acid. The relatively intermediate-chain-length carboxylic acids are preferred, particularly those of from six to eighteen carbon atoms.

In accordance with the invention a metal complex catalyst having incorporated therein a biphyllic ligand such as carbon monoxide in conjunction with other selected biphyllic ligands and in particular phosphines such as, for example, tributyl phosphine or triphenyl phosphine, constitutes the principal catalytically active material present in the reaction zone. But additionally, a carboxylic acid as already set forth, as for example an intermediate oil-soluble alkanoic acid such as octanoic acid, is supplied to the reaction zone in an amount sufficient to stabilize the complex and to diminish markedly the deposition of catalyst metal onto the walls and inner surfaces of the reaction zone and product recovery apparatus. While the exact mechanism of the function of the carboxylic acid is not completely understood, it is believed that the metal, which may under conventional operating conditions be released from the complex catalytic material, is retained in the form of a soluble metal salt when carboxylic acid is present according to the teachings of this invention, thereby preventing removal of the metal from the reaction mass through the deposition thereof onto the apparatus as normally occurs in the procedures heretofore proposed. The catalytically active complex appears to be remade under reactor conditions from the soluble metal salt.

As used throughout the specification and claims, the term "complex" indicates a coordination compound which is a combination of a metal atom with one or more electronically-rich molecules or atoms capable of independent existence. The metal is held in complex combination with several biphyllic ligands, the number thereof ordinarily being equal to the coordination number of the metal involved. By "biphyllic ligand" is meant a compound having an element with a pair of electrons capable of forming a coordinate bond with a metal atom and simultaneously having the ability to accept electrons from the metal, thereby providing additional stability to the resulting complex. This term has been defined by R. G. Pearson, H. B. Gray and F. Basolo, J. Am. Chem. Soc. 82, 787 (1960). The carbon monoxide molecule is an excellent example of a biphyllic ligand and may serve as such in the complexes suitable for catalytic purposes in the process of the present invention. Such catalysts have been amply described in the copending application referred to hereinbefore.

In accordance with the invention, the hydroformylation reaction is carried out by intimately contacting an olefin, generally in liquid phase, with carbon monoxide and hydrogen in the presence of the metal complex catalyst, such as, for example, a cobalt-containing material having a phosphine ligand, under conditions of temperature and pressure suitable to form the hydroformylated product. The particular conditions selected will depend largely on the type of final product desired. In this connection, both alcohols and aldehydes may be produced, as will be apparent from a consideration of the hydroformylation processes taught in the art. The temperature accordingly will be in the range of from 100° to 300° C. with about 150° to 200° C. being suitable in most instances. Pressures in the order of 1 atm. or less may be employed; however from 50 to 500 p.s.i.g. of hydrogen and carbon monoxide are generally preferred. Higher pressures, even to the extent of 1000 p.s.i., of course, may be used if desired under appropriate conditions.

As will be understood from the general equation given for a typical hydroformylation reaction, to produce alcohols, at least one mole of carbon monoxide and two moles of hydrogen for each mole of olefin is required. If, on the other hand, conditions are selected wherein the product is primarily aldehyde, only one mole of hydrogen is needed for each mole of olefin. Highest yields, therefore, require at least the aforesaid stoichiometric amounts of carbon monoxide and hydrogen reactants. These reactants may, however, be present in an excess over the olefin.

The ratio of hydrogen to carbon monoxide at any given time may be varied according to the particular olefin being hydroformylated. Generally the ratio will be at least 1. It has been found in many cases that the rate of reaction, as well as the yield of desired primary alcohol product, may be increased by increasing the $H_2$ to CO ratio to about 2, although higher ratios up to about 10 or more may be used.

Ratios of catalyst to the olefin feed are not particularly critical; they may be varied in order to achieve the homogeneous solution. Solvents, consequently, are not required but may be used if desired. Suitable solvents include saturated hydrocarbons, ketones, alcohols and ethers, for example. In general, higher concentrations of catalyst will produce a faster reaction rate. Ratios of catalyst to olefin between 1:1000 and 10:1 will normally be found satisfactory.

In carrying out the process of the present invention, a carboxylic acid is supplied to the reaction zone in amounts sufficient to prevent substantial deposition of the metal complex catalyst and the relative amounts of the carboxylic acid to metal complex catalyst may be varied within rather broad ranges. For instance, the ratio of carboxylic acid to complex catalyst may be from 0.1 to 10 on a molecular basis with a preferred range being from about 1 to 3. Illustrative of the invention, 2 moles of carboxylic acid per 1 mole of cobalt has been found particularly advantageous under plant operating conditions.

It is contemplated within the scope of the invention either to add appropriate amounts of the advantageous carboxylic acid to the reaction zone, either continuously or as a charge thereto, or to synthesize the catalyst in situ by reacting the selected metal salt of the selected carboxylic acid with the desired ligand, thereby assuring the presence of at least a portion of the carboxylic acid radical in the reaction zone. In the event that the complex is formed in situ from the metal carboxylate, it may be found expedient and advantageous to maintain a certain level of carboxylic acid radical (carboxylate) in the reaction zone by the addition of appropriate amounts thereof to said zone.

A convenient method for preparing the transition metal complex catalyst is to combine in liquid phase a compound such as an organic acid salt of such metal with the desired biphyllic ligand such as tributyl phosphine. The valence state of the transition metal may then be reduced by treating the solution with a mixture of hydrogen and carbon monoxide. The reduction may be performed prior to the use of the catalyst or it may be accomplished in situ in the hydroformylation reactor wherein the catalyst is to be used in conjunction with the carboxylic acid radical of the present invention. As another alternative, the catalyst may be prepared from a carbon monoxide complex of the desired transition metal. For example, it is possible to start with dicobalt octacarbonyl, and by simply contacting this compound with a suitable biphyllic ligand such as tributyl phosphine, for example, the desired catalyst will be produced through the replacement by the ligand of one or more of the carbon monoxide molecules. Such method is convenient for regulating the number of carbon monoxide molecules and other types of ligand molecules present in the catalyst. Thus, as the amount of ligand added to the dicobalt octacarbonyl is increased, carbon monoxide molecules are correspondingly replaced in the complex until all of them may eventually be substituted by the ligand added, carbon monoxide itself being a biphyllic ligand as has already been mentioned.

The carboxylic acid may be added either as the free acid or as a salt. Suitable salts include the alkali metal or ammonium salts, for example. Also, as already mentioned, carboxylic acid may be added as the carboxylate salt of the metal to be used in the catalyst complex, i.e., as cobalt octoate, for example.

The invention will be more fully understood by consideration of the following examples of the process which serve to illustrate preferred embodiments of the invention as well as to indicate its advantages over the results obtained without using the carboxylic acid.

*Example I*

A batch reactor is charged with 25 grams of a solid carbonyl complex with the formula $$Co_2(CO)_6 \cdot 2P(n\text{-butyl})_3$$

plus 8 grams of acetic acid in a solvent of 1 liter ethyl amyl ketone. To this reactor is added 125 p.s.i.g. of carbon monoxide, 125 p.s.i.g. of propylene, and 250 p.s.i.g. of hydrogen. The reaction is carried out at 160° C. to yield a product of 70% w. n-butyl and 30% w. isobutyl aldehyde and alcohol. The conversion of propylene is complete in 6 hours. This batch reactor may be recharged with reactant gases a total of two times before the catalyst is dead. Without any added carboxylic acid, the catalyst is dead after one reaction.

*Example II*

The experiment cited above is repeated with the incorporation of 10 grams of propionic acid in place of the acetic acid added in the above example. The conversion of propylene is again complete in 6 hours, yielding a product comprising 75% w. n-butyol alcohol and 25% w. isobutyl alcohol. The batch reactor may be recharged a total of four times before the catalyst is dead.

*Example III*

The experiment cited in Example I is repeated except that 20 grams of octanoic acid is substituted for the acetic acid in Example I. The conversion of propylene is complete within one hour and the products comprise 88% w. n-butyl alcohol and 12% w. isobutyl alcohol. The reactor may be recharged six times before the catalyst is dead.

*Example IV*

The experiment cited in Example I is repeated except that 20 grams of stearic acid is substituted for the acetic acid cited in Example I. The conversion is complete within one hour and the product comprises 88% w. n-butyl alcohol and 12% w. isobutyl alcohol. The reactor may be recharged six times before the catalyst is dead.

*Example V*

A continuous reaction system is charged with sufficient catalyst complex of the formula $Co_2(CO)_6 \cdot 2P)n\text{-butyl})_3$ to give 1% w. cobalt in a solvent of ethyl amyl ketone.

A sufficient quantity of octanoic acid is added to give 1 mole of octanoic acid per mole of cobalt. A continuous reaction between propylene, hydrogen and carbon monoxide is then carried out at 500 p.s.i.g. pressure and 160° C. The reaction product, consisting of butanol and butyraldehyde, is continuously separated by flashing, and the solvent, containing the dissolved catalyst and octanoic acid, is recycled to the reactor. Under these conditions one-half of the soluble cobalt has disappeared after 140 hours' reaction time, i.e., a catalyst half-life of 140 hours.

When the experiment was repeated without any added carboxylic acid, half the soluble cobalt disappeared in only five hours, i.e., a catalyst half-life of only five hours.

*Example VI*

The continuous hydroformylation described in Example V is repeated except that 2 moles of octanoic acid per mole of cobalt are used. In this case, the half-life of the catalyst is in excess of 580 hours. The product is 88% w. n-butyl and 12% w. isobutyl aldehyde and alcohol.

*Example VII*

The continuous hydroformylation described in Example V is repeated except that a mixture of diphenyl ether and diphenyl is used instead of ethyl amyl ketone as the solvent. The catalyst half-life is in excess of 580 hours. The product is 88% w. n-butyl and 12% w. isobutyl aldehyde and alcohol.

*Example VIII*

The continuous hydroformylation described in Example V is repeated except that 2 moles of 2-ethyl butyric acid (a branched-chain alkanoic acid) per mole of cobalt are used. In this case the catalyst half-life is in excess of 580 hours. The product is 88% w. n-butyl and 12% w. isobutyl alcohol and aldehyde.

The following table showing the catalyst half-life in the continuous reaction as described in Example V demonstrates the improved reaction rate and stability of the catalyst in the presence of added carboxylic acid, and particularly in a continuous process.

[Reaction time[a]: 30 minutes. Temperature: 160° C.]

| Catalyst | Propylene conversion, percent w. | Catalyst half-life, hours |
|---|---|---|
| (A) $Co_2(CO)_6 \cdot 2P(Bu)_3$ | 22 | 5 |
| (B) $Co(CO)_3 \cdot P(Bu)_3$ | 46 | 6 |
| 75 A+25 B | 18 | 5 |
| Cobalt octoate+$P(Bu)_3$ | 62 | 580+ |
| A+1 mole octanoic acid/mole cobalt | 46 | 140 |
| A or B+2 moles octanoic acid/mole cobalt | 60 | 580+ |

[a] Residence time for the reaction mixture in one pass through the reactor. The catalyst and solvent, as described in Example V, were recycled continuously through the reactor and flasher.

Similarly, good results are obtained when carboxylic acids are used together with catalysts which are formulated with transition metals other than cobalt, including rhodium, ruthenium, iridium, rhenium, platinum, and the like, and with biphyllic ligands other than tributyl phospine, especially of trivalent Group V elements of the phosphorus family, having atomic numbers of from 7 to 51, inclusive, and including acyclic and alicyclic aliphatic and aromatic derivatives of the trihydrides (ammonia, phosphine, arsine, stibine), such as pyridine, pyrrolidine, tricyclohexyl phosphine, triphenyl phosphine, diphenylbutyl phosphine, triethyl arsine, tributyl arsine, tributyl stibine, and the like.

It will be noted from the table that not only is the half-life of the catalyst increased through the use of the carboxylic acid but also that catalyst activity is greatly increased.

While various carboxylic acids suitable for the purposes of the present invention may suggest themselves from following the procedure of the present invention, the determining factor of significance and importance is that the metal salt of the particular carboxylic acid be soluble in the reaction medium. Suitable carboxylic acids may be classified as follows.

(1) Monocarboxylic acids
    (a) Alkanoic acids such as acetic acid, propionic, acid, butyric acid, pivalic acid, 1,1-dimethylbutyric acid( n-hexanoic acid, 2-ethylbutyric acid, n-octanoic acid, 2-ethylhexanoic acid, palmitic acid, stearic acid, and the like;
    (b) Cycloalkanoic and cycloalkenoic acids such as the various naphthenic acids including such specific ones as cyclopentylcarboxylic acid, cyclohexylcarboxylic acid, alkylcyclopentylcarboxylic acids, and resin acids such as abietic acid, dihydroabietic acid, and the like;
    (c) Aromatic and arylalkanoic acids such as benzoic acid, naphthoic acid, toluic acid, phenylacetic acid, phenylpropionic acid, and the like.
(2) Polyfunctional carboxylic acids:
    (a) Aliphatic and aromatic polycarboxylic acids, such as adipic acid, glutaric acid, azelaic acid, $\alpha,\omega$-eicosandioic acid, phthalic acid, isophthalic acid, terephthalic acid, pyromellitic acid, and the like;
    (b) Hydroxy-, amino-, keto-, ether-, and the like aliphatic and aromatic carboxylic acids, such as lactic acid, 12-hydroxystearic acid, salicyclic acid, acetoacetic acid, $\alpha$-aminobutyric acid, $\gamma$-aminobutyric acid, $\omega$-aminocaproic acid, anthranilic acid, $\gamma$-hydroxybutyric acid, $\beta$-ethoxypropionic acid, $\beta$-hexyloxypropionic acid, $\beta$-dodecylaminopropionic acid, and the like, and corresponding heterocyclic acids such as tetrahydrofuroic acid, tetrahydropyran-2-carboxylic acid, $\alpha$-pyrrolidine-carboxylic acid, pyrrole-2-carboxylic acid, furoic acid, picolinic acid, nicotinic acid, isonicotinic acid, and the like.

Although the preferred acids are those which are active in the reaction system primarily due to the presence of the carboxylic acid group, other groups which exhibit reaction with one or more of the reactants or intermediate or primary desired product may be present since they do not interfere in general with the hydroformylation reaction. The acid may, for instance, contain an olefinic or acetylenic carbon-to-carbon linkage which may be hydroformylated without interfering with the function of the acid to stabilize the catalyst and enhance the reaction, even though it does consume a portion of the carbon monoxide and hydrogen. Also alcoholic hydroxyl groups either initially present in the acid or formed by hydroformation of an olefinic linkage may react with aldehyde, formed as intermediate to the hydroformylation alcohol, to form an acetal, but in a continuous process this becomes a minor portion and represents only a minor initial reduction in product yield.

The carboxylic acid should be selected such that it does not unduly react with the ligand directly to form a stable salt, thus destroying the metal/ligand coordination complex. The permissible acid strength of the acid thus in any given instance is dependent in part on the base strength of the ligand involved.

The hydroformylation catalyst suitable for use in the process of the present invention may be, in particular, such materials as those disclosed in the aforesaid copending application. These comprise a complex between a transition metal having an atomic number from 23 to 85 and a biphyllic ligand containing a trivalent atom selected from Group VA of the Periodic Table having an atomic number from 15 to 51, inclusive, and wherein the trivalent atom has one available pair of electrons. As used herein, Group VA of the Periodic Table refers to the group as shown in Handbook of Chemistry and Physics, 40th ed., pp. 448–449 (Chemical Rubber Publishing Company).

The materials involved in the catalyst of this invention are transistion metals having atomic numbers from 23 to 85. It is preferred, however, that the transition metal be one from Group VIII of the Periodic Table. It has been found that the metal cobalt is of particular desirability in the process of the present invention. Regardless of the transition metal ordinarily used, when the complex serving as catalyst is in its active form, the transition metal will be in a reduced valence state. This will normally be a zero valence state and may suitably be even lower, such as a −1 valence state.

Moreover, the catalysts which are useful in the hydroformylation process of the present invention must contain in addition to carbon monoxide at least one biphyllic ligand having a trivalent atom, such as, for example, antimony, arsenic, or phosphorus. In particular, a phosphine such as tributyl or triphenyl phosphine has been found especially suitable. It will be understood by those skilled in the art that analogous structures in which a phosphorus atom, for example, may be replaced by other materials such as arsenic or antimony, for example, will also be suitable. Other examples and descriptions of possible biphyllic ligands will be found in the aforesaid copending application.

The process of this invention is generally applicable to the hydroformylation of any aliphatic or cycloaliphatic compound having at least one ethylenic carbon-to-carbon bond. The invention is used to advantage in the hydroformylation of carbon-to-carbon ethylenically unsaturated linkages in hydrocarbons. Monoolefins such as ethlene, propylene, and butylene are a few examples of suitable hydrocarbons, although both branched- and straight-chain compounds having one or more of these ethylenic or olefinic sites may be hydroformylated. These sites may be conjugated, as in 1,3-butadiene, or non-conjugated, as in 1,5-hexadiene. Hydrocarbon cyclic compounds, such as cyclohexane, cyclopentene, cyclohexadiene, cyclopentadiene, cyclooctene, and 1,5-cyclooctadiene, are also suitable as feed to the hydroformylation process of this invention. Moreover, ethylenic carbon-to-carbon linkages of non-hydrocarbons may be hydroformylated. However, the invention is of particular significance and commercial importance for the hydroformylation of the lower molecular weight olefins, particularly of from two to about twelve carbons, to form their corresponding alcohols and/or aldehydes.

We claim as our invention:

1. In the process for the production of hydroformylation products wherein an olefinic hydrocarbon is reacted with carbon monoxide and hydrogen in a reaction zone at a temperature of from about 100 to about 300° C., and a pressure of from about atmospheric to about 1000 p.s.i.g., in the presence of a complex catalyst consisting essentially of a complex of cabalt with carbon monoxide and a trialkyl phosphine biphyllic ligand, the improvement which consists essentially of introducing into said reaction zone a monocarboxylic alkanoic acid higher boiling than said hydroformylation products and having from 6 to 18 carbon atoms to the molecule, passing effluent from said reaction zone into a separating zone, distilling a vapor fraction comprising hydroformylation products and unconverted reactants from a liquid fraction comprising said complex catalyst and said monocarboxylic alkanoic acid in said separating zone, recycling at least a part of said liquid fraction from said separating zone to said reaction zone, and controlling the rate of introduction of said monocarboxylic alkanoic acid into said reaction zone to maintain a mol ratio of said monocarboxylic acid to said catalyst complex in said reaction zone in the range of from about 0.1 to 1 to about 10 to 1.

2. The process in accordance with claim 1 wherein said mole ratio of said monocarboxylic acid to said catalyst complex is maintained in the range of from about 1 to 1 to about 3 to 1.

3. The process in accordance with claim 2 wherein said monocarboxylic alkanoic acid is octanoic acid.

4. In the process for the direct single stage production of butanol wherein propylene is reacted with carbon monoxide and hydrogen in a reaction zone at a temperature of from about 100 to about 300° C., and a pressure of from about atmospheric to about 500 p.s.i.g., in the presence of a complex catalyst consisting essentially of a complex of cobalt, carbon monoxide and a trialkyl phosphine biphyllic ligand, the improvement which consists essentially of introducing into said reaction zone a monocarboxylic alkanoic acid having from 6 to 18 carbon atoms to the molecule, passing the effluent from said reaction zone into a separating zone, distilling a vapor fraction comprising butanol and unconverted reactants from a liquid fraction comprising said catalyst and said monocarboxylic alkanoic acid in said separating zone, recycling at least a part of said liquid fraction separated in said separating zone to said reaction zone, and controlling the rate of introduction of said monocarboxylic alkanoic acid into said reaction zone to maintain the mol ratio of said monocarboxylic alkanoic acid to said catalyst complex in said reaction zone in the range of from about 1 to 1 to about 3 to 1.

5. The process in accordance with claim 4 wherein said monocarboxylic alkanoic acid is octanoic acid.

References Cited by the Examiner

UNITED STATES PATENTS

| | | | |
|---|---|---|---|
| 2,509,878 | 5/1950 | Owen | 260—604 |
| 2,557,701 | 6/1951 | Smith | 260—605 |
| 2,564,130 | 8/1951 | Schreyer | 260—604 |
| 2,640,074 | 5/1953 | Gresham et al. | 260—604 X |
| 2,757,200 | 7/1956 | Jones et al. | 260—604 |
| 3,102,899 | 7/1960 | Cannell | 260—604 X |
| 3,150,188 | 9/1964 | Eisenmann et al. | 260—604 |

FOREIGN PATENTS

| | | |
|---|---|---|
| 614,010 | 12/1948 | Great Britain. |
| 638,754 | 6/1950 | Great Britain. |
| 784,629 | 10/1957 | Great Britain. |

OTHER REFERENCES

Hieber et al.: Chemical Abstracts, vol. 52 (1958), pp. 20146–20147.

LEON ZITVER, *Primary Examiner.*

CHARLES B. PARKER, *Examiner.*

J. J. SETELIK, B. HELFIN, *Assistant Examiners.*